Figure 1:
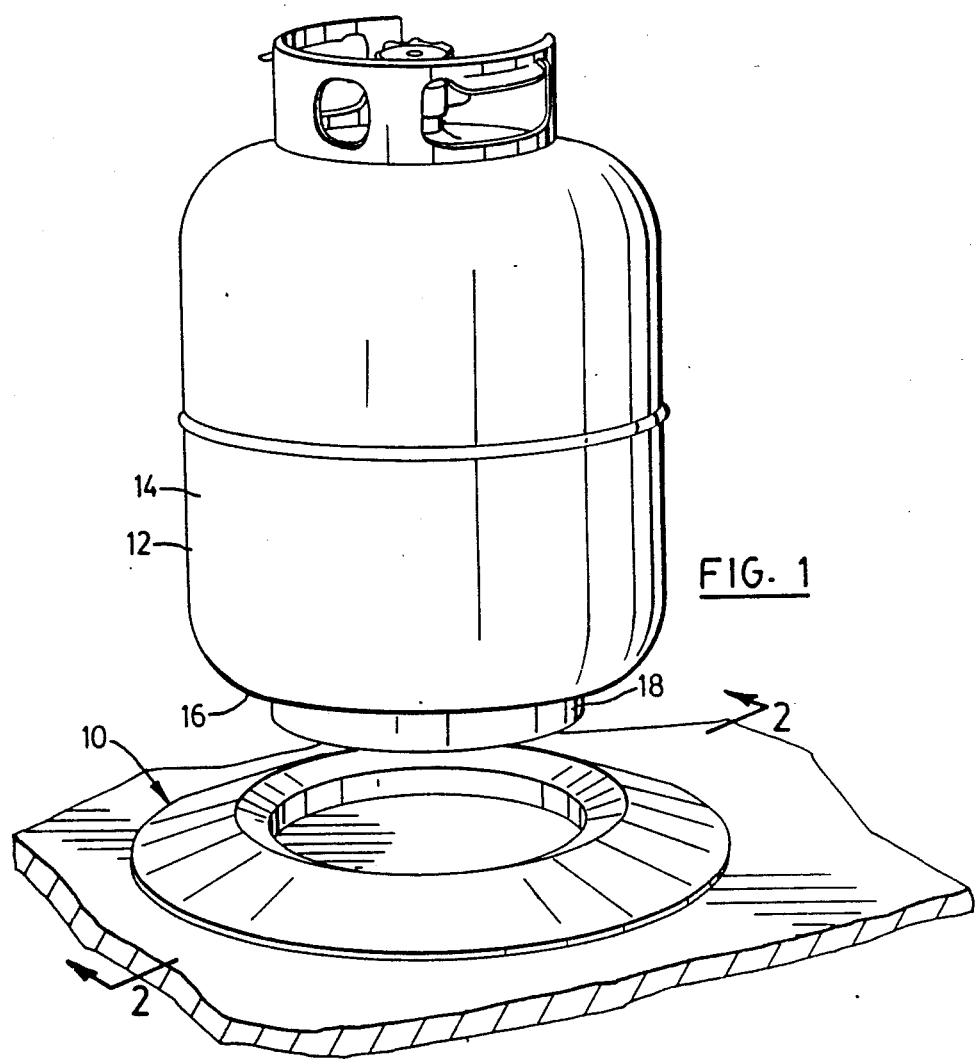

United States Patent [19]

Kowk

[11] Patent Number: 4,932,621
[45] Date of Patent: Jun. 12, 1990

[54] SUPPORT BASE FOR PROPANE TANKS

[76] Inventor: Ronald Kowk, No. 23, 2899 Steeles Ave. West, Downsview, Ontario, Canada, M3J 3A1

[21] Appl. No.: 391,946

[22] Filed: Aug. 10, 1989

[30] Foreign Application Priority Data

Aug. 12, 1988 [CA] Canada .................................. 574682

[51] Int. Cl.⁵ ............................................. A47G 23/02
[52] U.S. Cl. ..................................... 248/146; 248/346
[58] Field of Search ............... 248/146, 152, 154, 346, 248/678, 671, 349, 144, 310; 220/18, 69; 211/71, 72; 224/42.44; 410/42

[56] References Cited

U.S. PATENT DOCUMENTS

| | | | |
|---|---|---|---|
| 1,571,254 | 2/1926 | Foote | 248/346 X |
| 2,905,351 | 9/1959 | Lerner | 220/69 X |
| 3,394,832 | 7/1968 | McAllister | 220/69 X |
| 3,503,577 | 3/1970 | Martin | 248/346 X |
| 3,735,895 | 5/1973 | Roper | 220/69 X |
| 4,344,645 | 8/1982 | Kirk | 220/69 X |
| 4,489,846 | 12/1984 | Nickel | 220/18 X |
| 4,770,428 | 9/1988 | Sugiyama | 224/42.44 |

Primary Examiner—J. Franklin Foss
Attorney, Agent, or Firm—Fetherstonhaugh & Co.

[57] ABSTRACT

A support pedestal for a gas cylinder of the type which has a cylindrical-shaped base projecting from the rounded lower end of the main body of the gas cylinder. The pedestal has a body which has a cylindrical-shaped bore proportioned to receive the cylindrical-shaped base of a gas cylinder in free fitting relationship. The body also has an upper face which includes a support section which extends radially outwardly and upwardly from the bore at a height which will permit it to function as a seat for a portion of the rounded lower end of a gas cylinder seated on the pedestal in use. The body also has a wide base upon which it rests. The base is sufficiently wide to project laterally beyond the outer circumference of the gas cylinder which it is designed to support in order to provide a stable support for supporting the gas clyinder in an upright position.

2 Claims, 1 Drawing Sheet

U.S. Patent  Jun. 12, 1990  4,932,621

SUPPORT BASE FOR PROPANE TANKS

This invention relates to a support pedestal for a gas cylinder.

Gas cylinders of the type used for storing propane or the like for use in association with barbeques generally have a cylindrical-shaped storage container which has a rounded lower end to which a cylindrical-shaped base is attached. The cylindrical-shaped base has a diameter which is substantially less than the diameter of the cylindrical-shaped container with the result that these containers are rather unstable. Consumers frequently transport these containers to and fro between a refill station in an automobile. The rapid acceleration, deceleration and cornering of an automobile in normal use is sufficient to cause a gas cylinder of this type to topple over and in some cases in so doing, the manually controlled shut-off valve may be jarred into a partially open configuration which may result in leakage. In addition, the temperature build-up which may occur during transportation in an automobile may be sufficient to cause the pressure relief valve to open to relieve the pressure in the container. If leakage occurs when the tank is not in the upright position, the leakage may be in the liquid phase and this escaping liquid will generate a very large volume of gas for even a very small liquid leak. Leakage is a very serious problem when transporting flammable gaseous substances in an automobile as the normal operation of an automobile and its engine can serve to ignite highly flammable gases.

Despite the fact that the inhered instability of gas cylinders is well known, no attempts have been made to provide an inexpensive support pedestal which will increase the stability of a conventional gas cylinder without requiring modification to the structure of the cylinder.

While it is well known to provide a wide base in order to add stability to a container which is to be stored in an upright configuration, if the conventional gas cylinder was modified in order to provide a wide base, it would make the storage of a plurality of these cylinders very difficult because the floor space required for a stack of these cylinders would be determined by the diameter of the base rather than the diameter of the storage compartment.

Because gas storage cylinders are designed to withstand extremely high pressures, they are thick-walled metal containers and even the gas cylinders which are used in association with barbecues which have a small capacity are heavy even when empty and are considerably heavier when fully charged. As a result, considerable loads would be applied to any stabilizing base which might be designed to support the entire weight of the container.

Gas barbecues generally have a frame structure which includes a supporting structure for supporting the gas cylinder in an upright position when it is coupled to the burner of the barbecue. As a result, it is not practical to make a permanent modification to the gas cylinder in order to increase its self-supporting characteristics as to do so would involve the addition of a base which would prevent the mounting of the cylinder on the frame of the barbecue. This would present a major problem in barbecues which are designed to be portable and which have a frame which is mounted on support wheels.

I have found that it is possible to overcome the difficulties of the prior art described above by providing a simple and inexpensive form of support pedestal for a gas cylinder which is capable of cooperating with the cylinder in order to enhance the stability of the cylinder when it is located in an upright position.

In order to provide support for the cylinder, the support pedestal has a support surface which is arranged to underlie and provide a seat for the rounded lower end portions of the cylinder which protect outwardly beyond the support collar of the cylinder.

The seat is preferably inclined downwardly and inwardly toward the bore of the support pedestal so as to center the pedestal with respect to the cylinder. The bore of the pedestal preferably has a diameter which will receive the support collar of the cylinder in a free-fitting relationship which will further contribute to the self-centering capability of the pedestal.

The body of the support pedestal is preferably made from a rigid plastics material which has sufficient resilience to deflect under the weight of the cylinder to ensure that the lower end of the support collar of the cylinder will make contact with the underlying support surface so that the underlying support surface will support a major portion of the weight of the cylinder in use with the result that a support pedestal will serve to prevent tipping without necessarily bearing an excessively heavy load.

According to one aspect of the present invention, there is provided a support pedestal for a gas cylinder of the type which has a cylindrical-shaped base projecting from the rounded lower end of the main body of the gas cylinder comprising a body having a cylindrical-shaped bore proportioned to receive the cylindrical-shaped base of a gas cylinder in free fitting relationship, said body having an upper face which includes a support section which extends radially outwardly and upwardly from the bore at a height which will permit it to function as a seat for a portion of the rounded lower end of a gas cylinder seated on the pedestal in use, said body having a wide base upon which it rests, the base being sufficiently wide to project laterally beyond the outer circumference of the gas cylinder which it is designed to support in order to provide a stable support for supporting the gas cylinder in an upright position.

Figure 2:
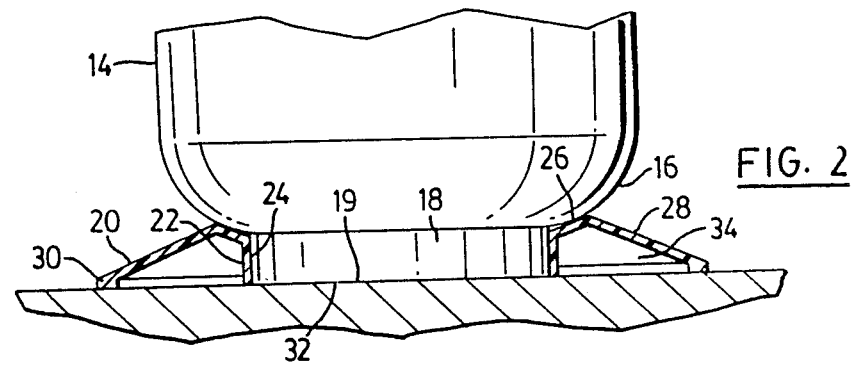

The invention will be more clearly understood after reference to the following detailed specification read in conjunction with the drawings wherein;

FIG. 1 is a pictorial top view of a support pedestal and a cylinder to be supported thereby, FIG. 2 is a sectional side view taken along the line 2—2 of FIG. 1.

With reference to FIG. 1 of the drawings, the reference numeral 10 refers generally to a support pedestal constructed in accordance with an embodiment of the present invention. The support pedestal 10 is used for supporting a gas cylinder 12 of the type which has a cylindrical-shaped container body 14 which has a rounded lower end 16. A cylindrical collar 18 is secured to the lower end of the cylindrical body 14 and has a diameter which is substantially less than that of the cylindrical body 14 The height of the support collar 18 varies slightly from one manufacturer to another as does the curvature of the rounded end 16.

The support pedestal 10 is formed from a unitary body 20 which is preferably made from a substantially rigid plastics material such as polypropelene or nylon. The body 20 is formed with a cylindrical portion 22 which has a bore 24 which is proportioned to receive the collar 18 in a free-fitting relationship. The body 20 also has a support section 26 which extends radially upwardly and outwardly from the upper end of the cylindrical portion 22 and serves to provide a seat which bears against the rounded lower end of the gas cylinder. By proportioning the bore 24 so that it is a free-fit with respect to the collar 18, the pedestal will become substantially self-centering in that the rounded bottom 16 will bear against the seat and will serve to deflect the support pedestal to a position in which the seat will provide a support contact around the full perimeter of the rounded lower end of the cylinder. The pedestal also includes an upper web 28 which extends radially outwardly and downwardly from the support section 26 to an outer cylindrical-shaped ring 30. The diameter of the ring 30 is substantially greater than the diameter of the cylindrical body portion 14 of the cylinder with the result that the base of the pedestal which is formed by the lower end of the cylindrical portion 22 and the ring 30 is a wide base which will serve to add stability to the assembly.

The cylindrical portion 22 and the support section 26 are proportioned such that the height of the seat formed by the support section 26 is proportioned to accommodate the collars 18 of the maximum height such that the lower end 19 of the collar 18 will just bear against the underlying support surface 32 on which the support pedestal is resting. As a result when a cylinder having a collar which has a height less than the maximum is located in the pedestal, the pedestal will support the full weight of the cylinder.

When a support pedestal is to be constructed for use in association with the conventional propane gas storage tank which is commonly in use in association with barbecues and which has collar portion 18 which measures about 8" in diameter, the bore 24 is 8¼ in diameter to provide about a ¼" clearance. The angle of inclination of the support section 26 is about 30° to the horizontal plane. The length of the support section from the upper end of the cylindrical section 14 to the upper end of the outer section 28 is preferably about 1.25" and the external diameter of the ring 30 is about 16".

Various modifications of the structure of the present invention will be apparent to those skilled in the art.

For example, in order to support cylinders which may be larger and heavier than those commonly used for barbecues, the pedestal may have a greater diameter and stiffening ribs may be provided in the cavity 34 which may extend from the cylindrical portion 22 to the outer ring 30.

The embodiments of the invention in which an exclusive property or privilege is claimed are defined as follows.

1. A support pedestal for a gas cylinder of the type which has a cylindrical-shaped base of a predetermined height projecting from the rounded lower end of the main body of the gas cylinder comprising:
   a body having a cylindrical-shaped bore proportioned to receive the cylindrical-shaped base of a gas cylinder in free fitting relationship, said body having an upper face which includes a support section which extends radially outwardly and upwardly from the bore at a height which will permit it to function as a seat for a portion of the rounded lower end of a gas cylinder seated on the pedestal in use, said body having a wide base upon which it rests, the base being sufficiently wide to project laterally beyond the outer circumference of the gas cylinder which it is designed to support in order to provide a stable support for supporting the gas cylinder in an upright position said bore having a height that is substantially equal to the predetermined height of the cylindrical shaped base whereby the cylindrical shaped base of a gas cylinder may extend through said bore so that little or none of the weight of the gas cylinder is carried by the support pedestal while the support section contributes substantially to the stability of the gas cylinder in use.

2. In combination a support pedestal and a gas cylinder comprising;
   a support pedestal comprising an annular shaped body which has a cylindrical-shaped bore which opens vertically therethrough, said body having an upper face which includes a support section which extends radially outwardly and upwardly from the bore, and
   a gas cylinder having a cylindrical-shaped base projecting from the rounded lower end of the main body thereof, said gas cylinder being seated in said support pedestal with said cylindrical-shaped base located in said bore in a free fitting relationship,
   said bore and said support section of said support face being proportioned and arranged such that the cylindrical shaped base extends through the bore and rests upon the underlying surface such that little or none of the weight of the gas cylinder is carried by the pedestal when the gas cylinder is upright, said support section which extends radially outwardly and upwardly from the bore at a height such that it underlies and forms a seat for a portion of the rounded lower end of a gas cylinder,
   said annular-shaped body having a wide base upon which it rests, the base being sufficiently wide to project laterally beyond the outer circumference of the gas cylinder which it supports in order to provide a stable support for supporting the gas cylinder in an upright position.

* * * * *